United States Patent
Coppola

(10) Patent No.: US 7,628,552 B2
(45) Date of Patent: Dec. 8, 2009

(54) BIPOD PLATFORM SYSTEM FOR A CAMERA

(76) Inventor: Roman Coppola, 1641 N. Ivar Ave., Hollywood, CA (US) 90028

( * ) Notice: Subject to any disclaimer, the term of this patent is extended or adjusted under 35 U.S.C. 154(b) by 0 days.

(21) Appl. No.: 12/115,323

(22) Filed: May 5, 2008

(65) Prior Publication Data
US 2008/0226284 A1    Sep. 18, 2008

Related U.S. Application Data

(63) Continuation-in-part of application No. 11/403,136, filed on Apr. 11, 2006, now abandoned.

(60) Provisional application No. 60/670,575, filed on Apr. 11, 2005.

(51) Int. Cl.
G03B 17/00 (2006.01)
A47K 1/04 (2006.01)
B62B 7/02 (2006.01)
H04N 5/222 (2006.01)
G03B 19/18 (2006.01)

(52) U.S. Cl. .................. 396/428; 348/722; 248/125.1; 248/129; 280/79.11; 280/47.131; 280/47.27; 352/53; 352/243

(58) Field of Classification Search .............. 396/427, 396/428; 310/112; 248/125.1, 129, 440.1; 348/211.7; 352/53, 243; 280/79.11
See application file for complete search history.

(56) References Cited

U.S. PATENT DOCUMENTS

| | | | |
|---|---|---|---|
| 3,445,082 A | 5/1969 | Proctor et al. | 248/183.3 |
| 3,533,583 A | 10/1970 | Azim | 248/125.2 |
| 3,586,278 A | 6/1971 | Simons | 248/165 |
| 3,952,982 A | 4/1976 | Lewis | 248/287 |
| 4,029,246 A | 6/1977 | Woodruff | 224/275 |
| 4,309,099 A | 1/1982 | Flint | 396/428 |
| 4,348,034 A | 9/1982 | Welt | 280/35 |
| 4,671,479 A | 6/1987 | Johnson et al. | 248/173 |
| 4,697,773 A | 10/1987 | Jaumann et al. | 248/162.1 |
| 5,267,712 A | 12/1993 | Shen | 248/179.1 |
| 5,275,364 A * | 1/1994 | Burger et al. | 248/125.1 |
| 5,865,406 A | 2/1999 | Teeple | 248/187.1 |
| 5,903,995 A | 5/1999 | Brubach | 42/94 |
| 6,027,087 A | 2/2000 | Lindemann et al. | 248/188.5 |
| 6,056,450 A | 5/2000 | Walling | 396/428 |
| 6,354,750 B1 | 3/2002 | Romanoff | 396/428 |
| 6,439,515 B1 | 8/2002 | Powers | 248/129 |
| 6,644,871 B2 | 11/2003 | Nakatani | 396/428 |
| 6,663,071 B2 | 12/2003 | Peterson | 248/440.1 |
| 6,752,541 B1 | 6/2004 | Dykyj | 396/428 |
| 7,066,664 B1 | 6/2006 | Sitoh et al. | 396/428 |
| 7,140,622 B1 * | 11/2006 | Cantu | 280/79.11 |
| 7,473,041 B2 * | 1/2009 | Stanev et al. | 396/428 |
| 2005/0151036 A1 | 7/2005 | Speggiorin | 248/177.1 |
| 2005/0178935 A1 | 8/2005 | Brandes | 248/177.1 |
| 2007/0034753 A1 | 2/2007 | Lee | 248/121 |

* cited by examiner

Primary Examiner—Melissa J Koval
(74) Attorney, Agent, or Firm—Fish & Associates, PC

(57) ABSTRACT

A support structure for supporting an image capture device generally comprises a base, a first vertically oriented, elongated support member supported by the base, a mechanism that provides tilting and panning of the device relative to the first support member, and elevation of the device along the first support member, and a second elongated support member disposed to stabilize the mechanism. Preferred bases include bases that are foldable and/or rotatable, and ones that have a leveling device coupled to the base. Preferred support members can be rotatable relative to the base.

15 Claims, 8 Drawing Sheets

BIPOD PLATFORM SYSTEM FOR A CAMERA

This application claims the benefit of U.S. application Ser. No. 11/403,136, filed Apr. 11, 2006, which claims the benefit of U.S. Provisional Application No. 60/670,575 filed Apr. 11, 2005. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is camera support devices.

BACKGROUND

It is known to use support structures to stabilize cameras and other image capture devices that require a user to focus on a subject. Traditional support structures include monopods, bipods, tripods, and other support structures having more than three legs. (See e.g., U.S. Pat. No. 6,056,450 to Walling discloses a monopod, U.S. Pat. No. 4,309,099 to Flint discloses a bipod, U.S. Pat. No. 5,267,712 to Shen discloses a tripod, and U.S. Pat. No. 3,586,278 to Simons discloses a support structure having at least 4 legs).

There are numerous problems associated with these traditional support structures, such as: (1) the amount of ground space required as the height of the structure increases; (2) the height of a camera relative to the ground as constrained by the minimum height of the leg(s); and (3) the lack of ease with which one can adjust the pan, tilt, and elevation of a camera due to multiple adjustments.

It is also known to use camera support structures that provide pan, tilt, and elevational adjustments. For example, U.S. Pat. No. 3,952,982 to Lewis teaches a camera mount having various arms and brackets that have pan, tilt, and elevational adjustments.

Thus, there is still a need for a new and improved camera support structure system that may facilitate a more effective system for positioning a camera relative to a subject.

SUMMARY OF THE INVENTION

The present invention provides apparatus, systems and methods in which a structure for supporting an image capture device comprises: (1) a base; (2) a first vertically oriented, elongated support member supported by the base; (3) a mechanism that provides tilting and panning of the device relative to the first support member, and elevation of the device along the first support member; and (4) a second elongated support member disposed to stabilize the mechanism.

Preferred bases include those that are foldable and/or rotatable, and ones that have a leveling device coupled to the base. It is contemplated that at least one wheel can support the base to provide for rotation of the base relative to the ground or provide for transport of the device. Contemplated bases can have any suitable size and shape, but preferably are no more 10 cm in height, more preferably no more than 5 cm in height. Further, the size and weight of the base must be sufficient to allow the structure to remain in a stable upright position.

Preferred support members include those having a pole, shaft, mast, or other suitable support member that is supported by the base. It is contemplated that the support members can be rotatable relative to the base. The support members can have any suitable height or cross-sectional area, and can be composed of extending parts that increase the overall height of the device. The term "extending parts" is used herein to mean telescoping or collapsible parts, or additionally add-on extensions or other parts that a person of ordinary skill in the art would contemplate can increase or decrease the overall height of the device. Additionally, it is contemplated that the support members can have foldable parts.

In most preferred embodiments, the support members are at least 60 cm in length. Contemplated support members can include a ball and socket joint or other suitable tiltable connections coupled to an end of the support member and the base for increasing the overall adjustability of the device. It is further contemplated that a releasable coupling can be functionally disposed between the base and the support members, which allows the device to be disassembled for transport. A handle assembly is also contemplated that can be coupled to the support members. Still further, the first and the second support members can be parallel to each other, can be mounted to the same base, can form a V shaped configuration, or can be mounted to separate bases.

Preferred mechanisms that provide elevation of the device relative to the support members include counterbalance systems, actuators, cranking mechanisms, or other suitable manual or automatic adjustment mechanism that allows the image capture device to move up and down along the length of the support members. In addition, preferred mechanisms that provide panning and tilting of the device include manual adjustment arms, actuators, and any other suitable mechanism that provides panning and tilting. It is further contemplated that the mechanism can be controlled wirelessly to accomplish the panning, tilting, and elevation functions. As such preferred mechanisms allow the image capture device to tilt up/down, pan left/right, and move up/down in any direction necessary to capture the desired image or angle.

Contemplated method of positioning an image capture device includes: (1) panning the device relative a first vertically oriented, elongated support member supported by a base; (2) tilting the device relative to the first support member; (3) elevating the device relative to the first support member; and (4) positioning a second elongated support member to stabilize the device. It is contemplated that the preferred method includes adjusting tiltable connections coupling the first and second support members a base. In preferred embodiments, the contemplated method includes tilting and panning the device relative to the second support member, and elevating the device along the second support member.

Various objects, features, aspects and advantages of the inventive subject matter will become more apparent from the following detailed description of preferred embodiments, along with the accompanying drawings in which like numerals represent like components.

DETAILED DESCRIPTION

Figure 1A:
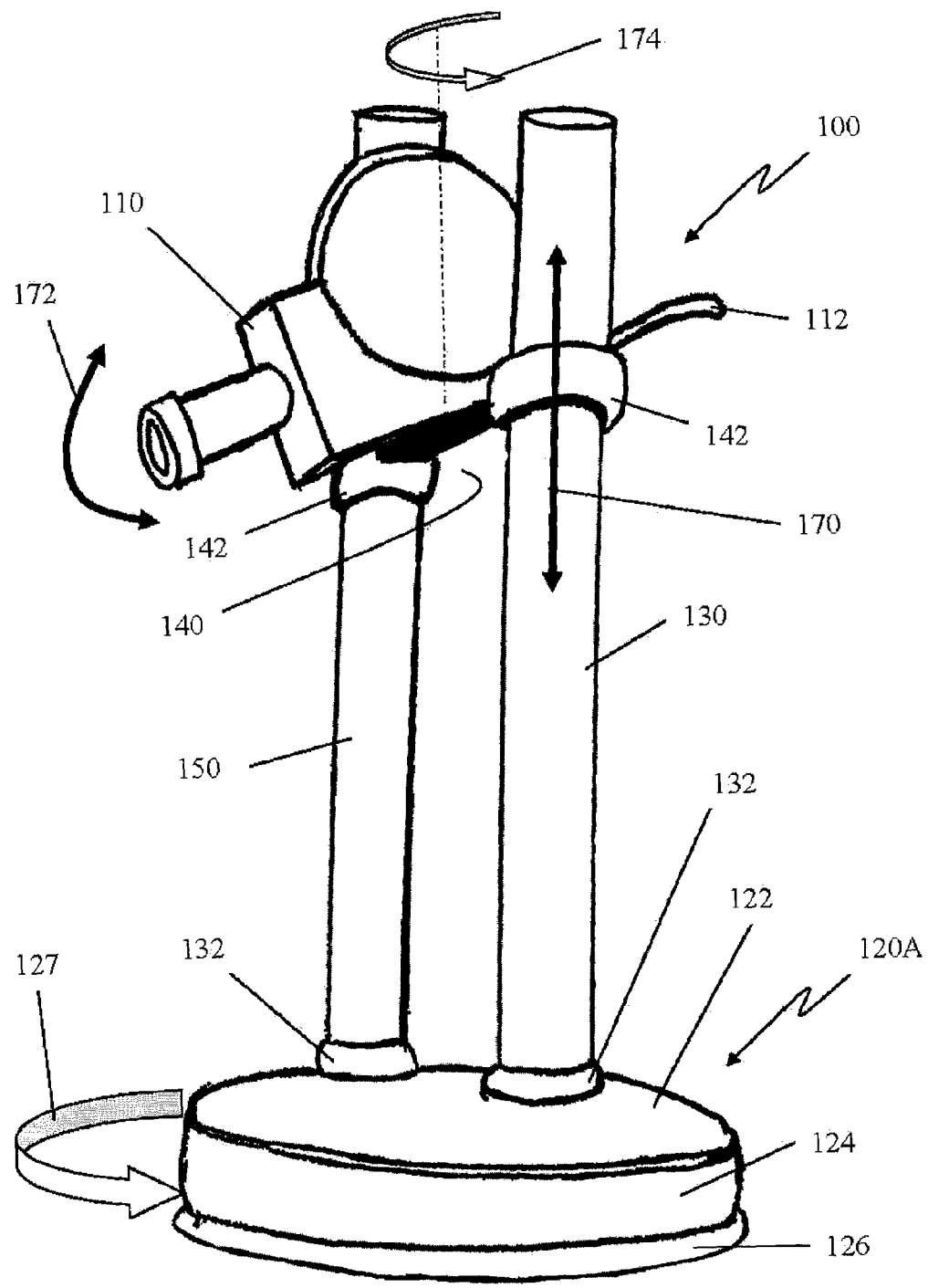
FIG. 1A is a view of an embodiment of an image capture device support structure having first and second elongated support members being supported by a rotatable base having a leveling device.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural changes may be made without departing from the scope of the present invention. The following description is, therefore, not to be taken in a limited sense, and the scope of the present invention is defined by the appended claims. Turning now to the drawings wherein like elements are identified by like numbers throughout.

FIGS. 1A-1E generally depict a support structure 100 for supporting an image capture device 110 having: (1) a base 120A-E as depicted in FIGS. 1A-1E, respectively; (2) a first vertically oriented, elongated support member 130 supported by the base 120A-E; (3) a mechanism 140 that provides tilting and panning of the device relative to the first support member 130, and elevation of the device along the first support member 130; and (4) a second elongated support member 150 disposed to stabilize the mechanism 140.

It should be appreciated that while FIGS. 1A-1E utilize two substantially parallel elongated support members 130 and 150, it is contemplated that support structure 100 could have more or less than two support members, such as a monopole or tripod design, so long as the support members sufficiently support the image capture device 110. Additionally, it is contemplated that support members 130 and 150 could be non-parallel (not shown) or have a fixed V-shape configuration (not shown). Preferred support members include a pole, shaft, mast, or other suitable support member that can any suitable height or cross-sectional area, but preferably support members are at least 60 cm in height. Preferred support members can be constructed out of any suitable material having a structure sufficient to allow manipulation of the image capture device relative to the base. The materials can vary considerably and typically include metals, metal alloys, natural and synthetic polymers, carbon and glass fibers, and all reasonable combinations thereof.

As depicted in FIGS. 3A-3D, support structures 300A, 300B, and 300C respectively, can be configured so that support members 310A, 320A, 310B, 320B, 310C, and 320C, respectively, can have extending or collapsible parts. It is further contemplated that the support members can have foldable parts (not shown). As discussed above, the term "extending parts" is used herein to mean telescoping or collapsible parts or additionally add-on extensions or other parts that a person of ordinary skill in the art would contemplate can increase or decrease the overall height of the device.

Figures 3A, 3B, 3C, 3D:
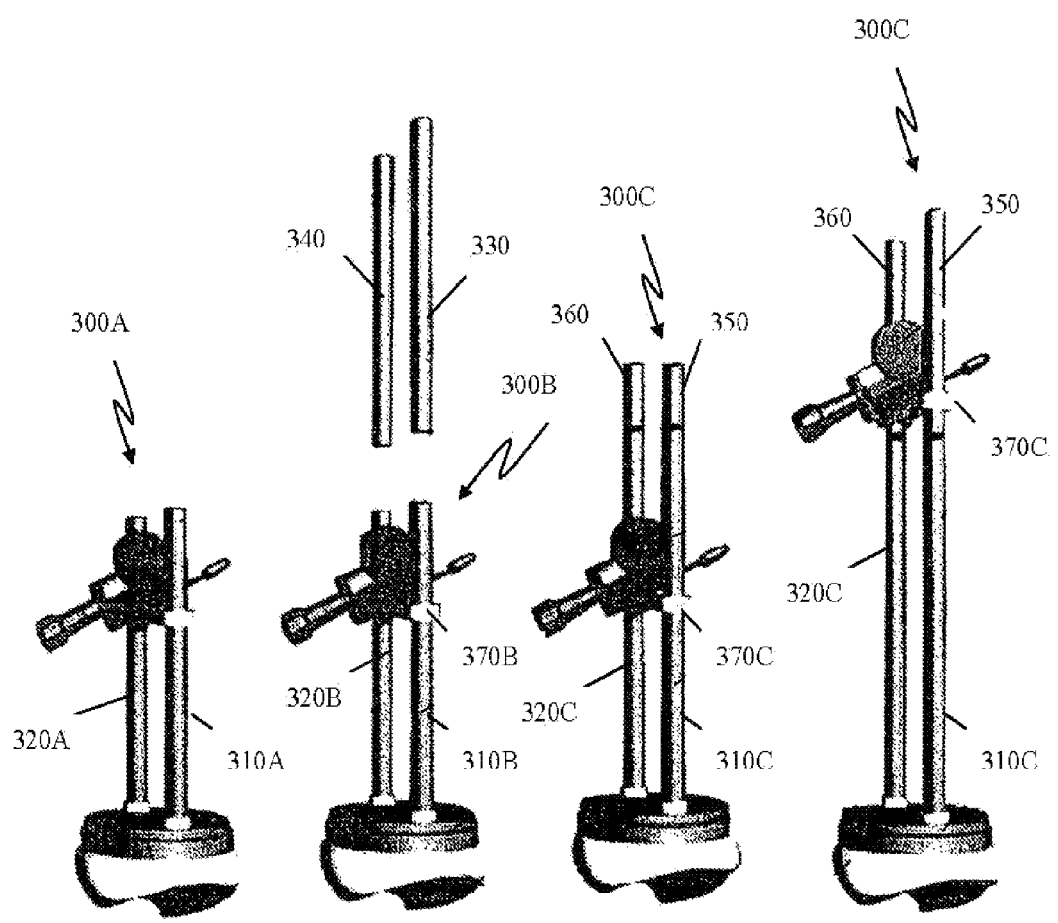
FIG. 3A is another view of the support structure of FIG. 1A.
FIG. 3B is a view of an alternative embodiment of the support structure having first and second elongated support members having add-on extensions.
FIG. 3C is a view of another alternative embodiment of the support structure having telescoping support members partially extended.
FIG. 3D is a view of the image capture device support structure of FIG. 3C having the telescoping support members fully extended.

As shown in FIG. 3B, support structure 300B can have add on extensions 330 and 340 that couple to support members 310B and 320B, respectively. It is further contemplated that multiple add extensions (not shown) can be utilized. Extensions 330 and 340 couple to support members 310B and 320B in any suitable manner including male and female mating portions, or other suitable couplers that provide sufficient structural stability. As shown in FIG. 3C, support members 310C and 320C can also include telescoping members 350 and 360, which are shown partially extended, and FIG. 3D telescoping members 350 and 360 are shown fully extended. As illustrated in FIGS. 3B and 3C, extensions 330, 340 and telescoping members 350, 360, respectively, provide a smooth transition, such that mechanisms 370B and 370C, respectively, can be raised and lowered in a seamless and uninterrupted fashion. In any case, regardless of how high the support members can extend, the image capture device can be lowered to a height substantially equivalent to the height of the base above the ground.

As shown in FIGS. 1A-1E, support members 130 and 150 are preferably coupled to the base via couplings 132 disposed between the base and the support members for increasing the overall adjustability of the device. Contemplated couplings can include: (1) tiltable couplings such as ball and socket joints or other suitable tiltable connections; (2) rotatable couplings such as those with ball bearings or other suitable rotatable couplings; and (3) releasable couplings such as those with threaded members or other suitable releasable couplings that allow the device to be disassembled for transport.

As shown in FIGS. 1A-1E, contemplated bases 120A-120E, respectively, can have any suitable size and shape, but preferably are no more 10 cm in height, and more preferably no more than 5 cm in height. The height of the base from the ground is important because it dictates how low image capture device 110 can be lowered to the ground. Further, the size and weight of the base must be sufficient to allow the structure to remain in a stable upright position.

FIG. 1A depicts preferred rotatable base 120A as generally having a support member mounting plate 122, a leveling device 124, and a rotatable base portion 126 (i.e. wheel) that allows support structure 100 to rotate 360 degrees. Rotation of base 120A, as indicated by arrow 127, can be accomplished using manual or automated systems, and of course can be performed during use of the image capture device.

Preferred support member mounting plate 122 can have any suitable size and shape, and can be constructed out of any suitable material having sufficient structural stability for supporting support members 130,150, mechanism 140, and image capture device 110. The materials can vary considerably and typically include metals, metal alloys, natural and synthetic polymers, carbon and glass fibers, and all reasonable combinations thereof. Preferred leveling device 124 includes pneumatic and hydraulic leveling systems, ball and socket leveling devices, and any other suitable leveling devices a person of ordinary skill in the art would contemplate could be suitable for use with the present invention.

Figure 1B:
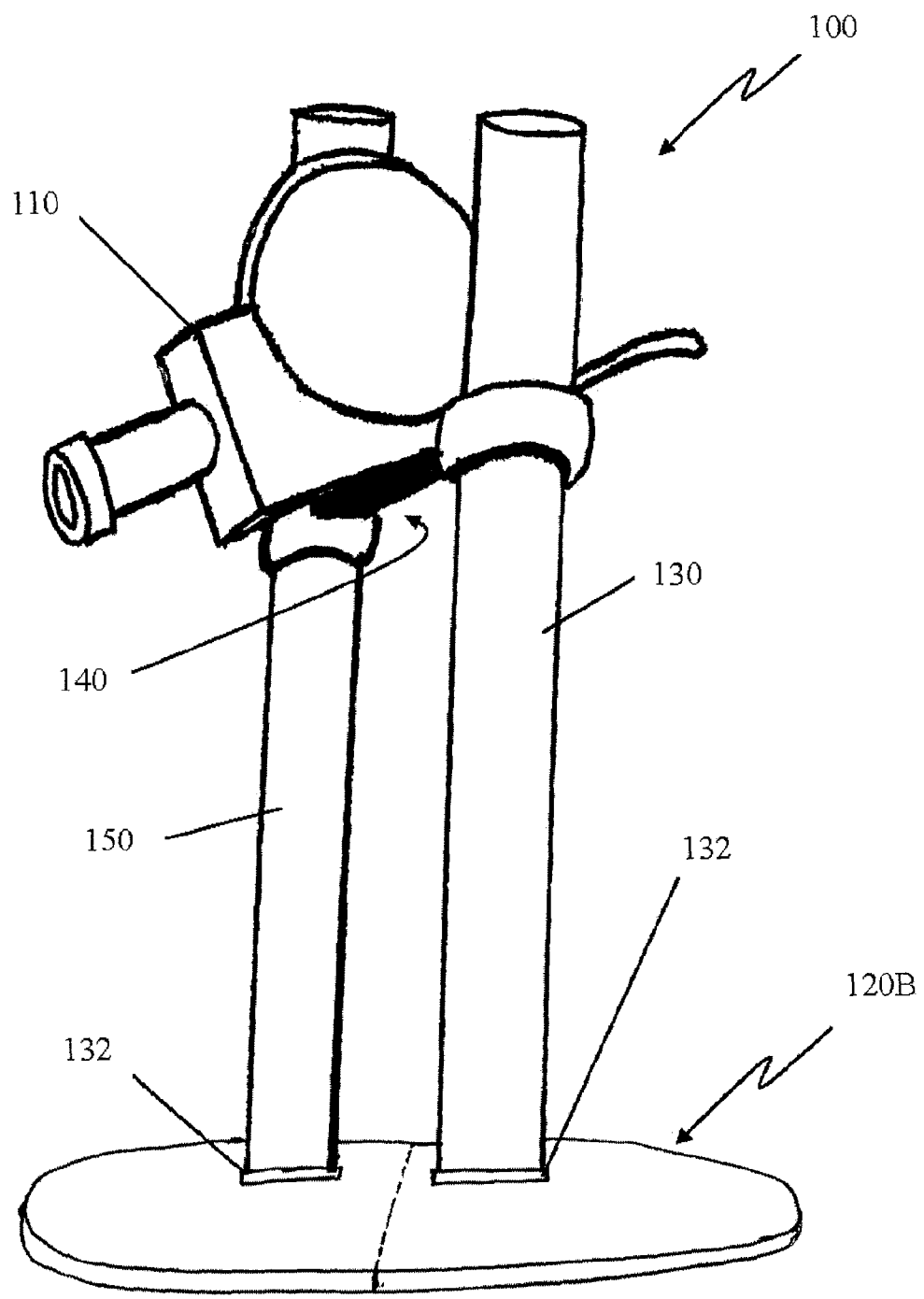
FIG. 1B is a view of an alternative embodiment of the support structure having first and second elongated support members supported by a foldable base.
Figure 1C:
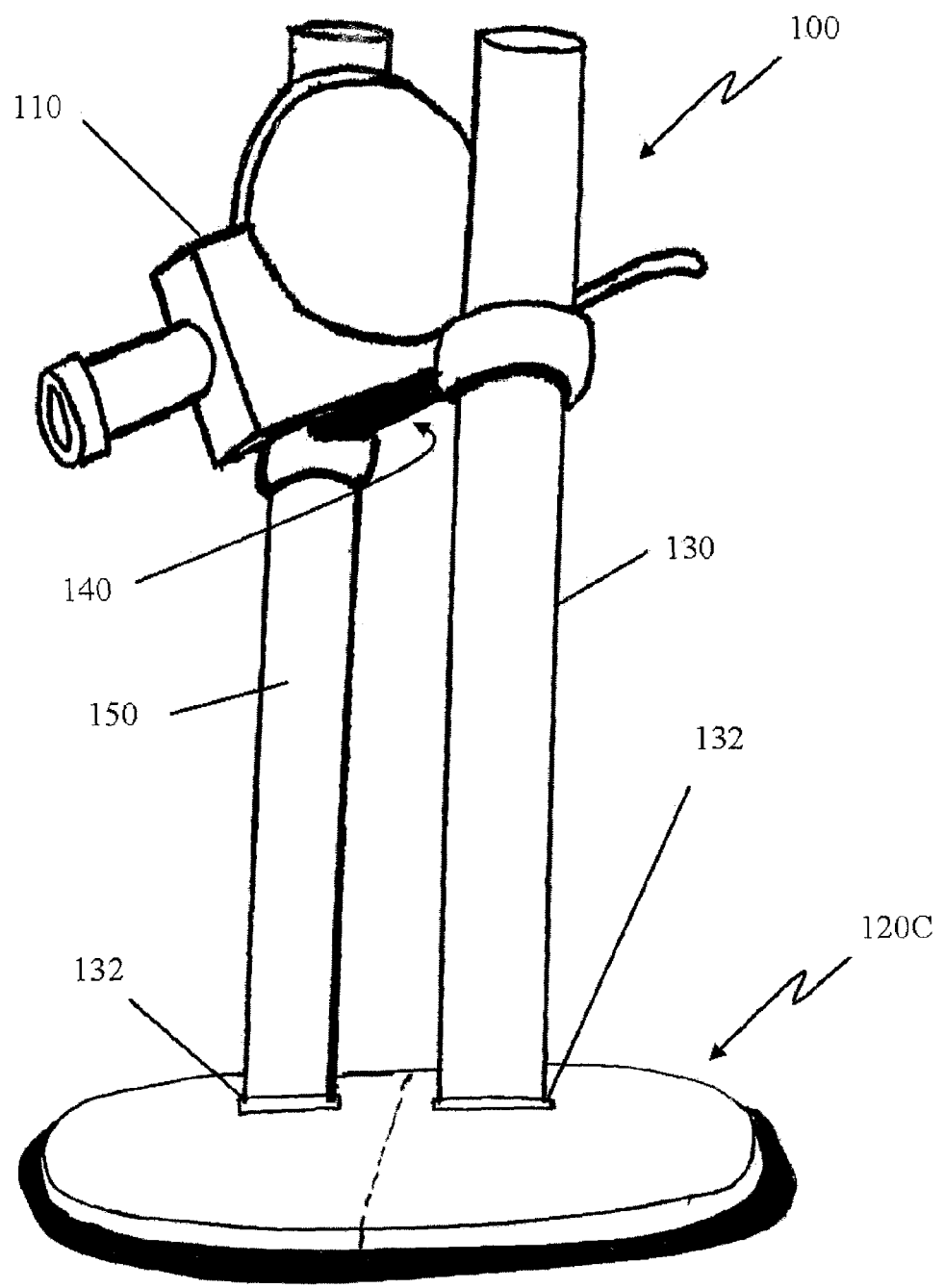
FIG. 1C is a view of another alternative embodiment of the support structure having first and second elongated support members supported by a rotatable and foldable base.
Figure 1D:
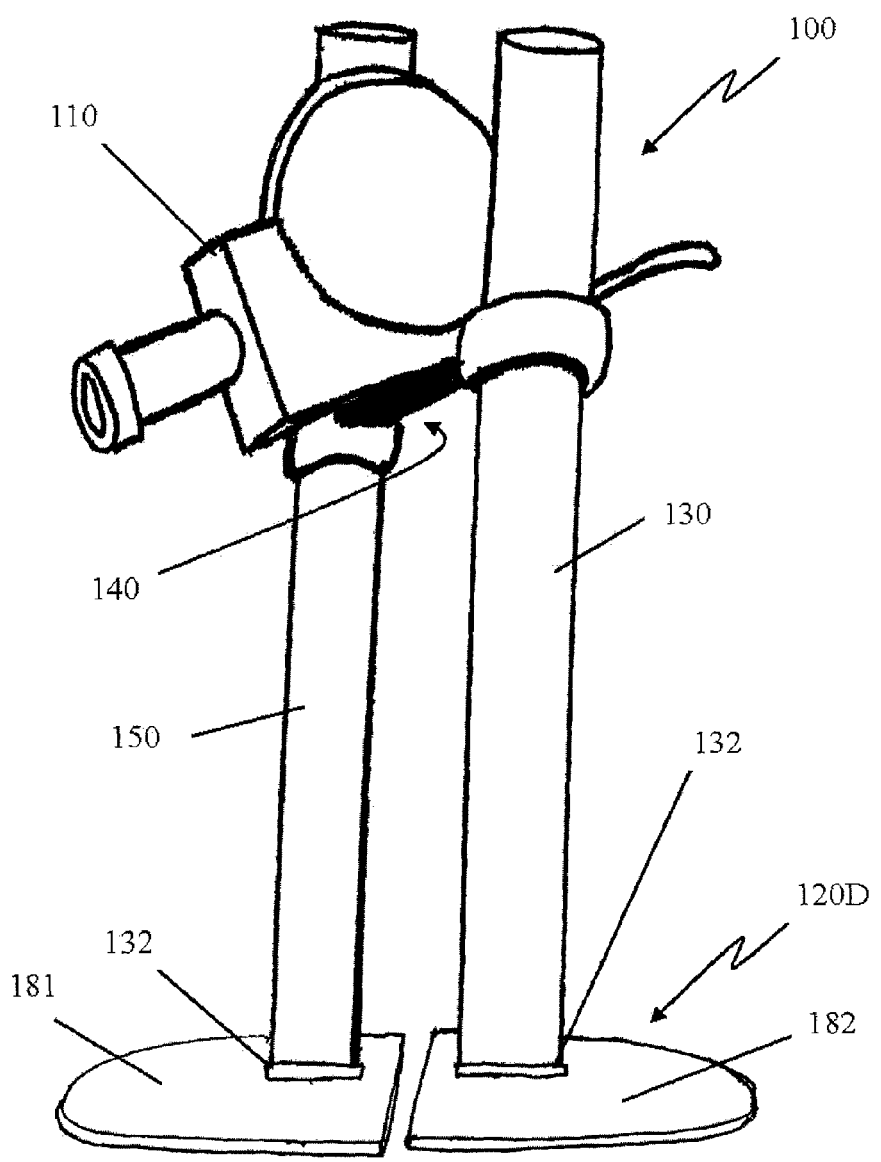
FIG. 1D is a view of yet another embodiment of the support structure having first and second elongated support members supported by a first and second base.
Figure 1E:
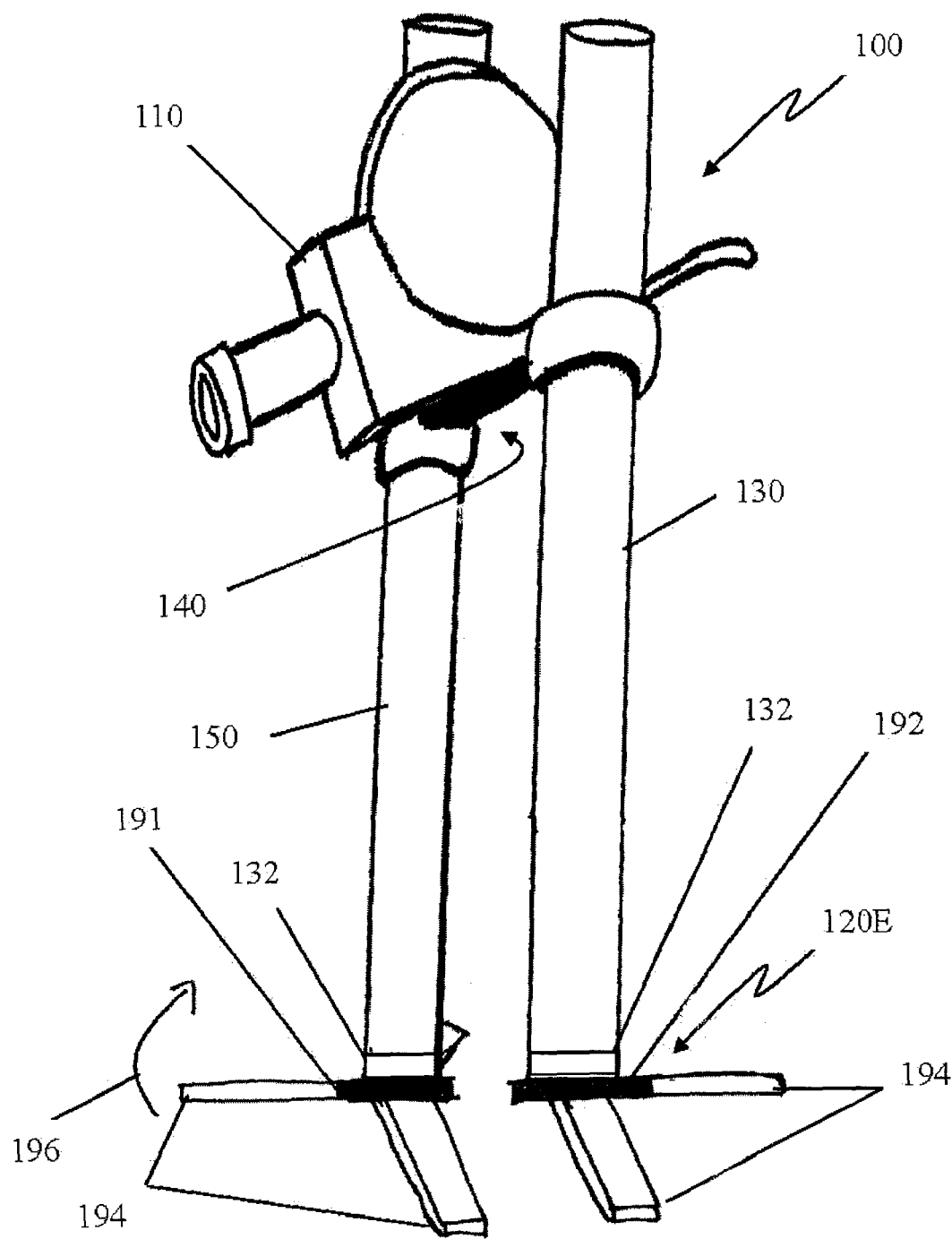
FIG. 1E is a view of still another embodiment of the support structure having first and second elongated support members supported by first and second foldable bases.

In addition to the rotatable base 120A depicted in FIG. 1A, it is contemplated that: (1) base 120B, as shown in FIG. 1B, can be foldable; (2) base 120C, as shown in FIG. 1C, can be foldable and rotatable; (3) base 120D, as shown in FIG. 1D, can have two separate base plates 181 and 182, such that support member 130 couples to base plate 182, and support member 150 couples to base plate 181; and (4) base 120E, as shown in FIG. 1E, can have two separate base plates 191 and 192 having leg supports 194 that can fold upwards as depicted by arrow 196.

As illustrated in FIG. 1A, mechanism 140 provides tilting and panning of image capture device 110 relative to support member 130, as depicted by arrows 172 and 174, respectively, and mechanism 140 also provides elevation of the device along support member 130, as depicted by arrow 170. As currently contemplated, support member 150 can be used to accomplish any one or more of: (a) stabilizing mechanism 140, (b) allowing tilting and panning of device 110 relative to support member 150, and (c) elevating the device along support member 150.

As depicted in FIG. 1A, image capture device 110 can be coupled to mechanism 140. Mechanism 140 can be coupled to support members 130 and 150 via brackets 142 or other suitable couplings a person of ordinary skill in the art would contemplate can be used to accomplish the objectives of the present invention. Brackets 142 cooperate with support members 130 and 150 to facilitate upward and downward movement of mechanism 140 along the support members as indicated by arrow 170. Such movement can be facilitated by use of a counterbalance mechanism (not shown), an actuator mechanism (not shown), a cranking mechanism (not shown), or other types of suitable manual or automatic adjustment mechanism that allows the image capture device 110 to move up and down along the length of support members 130 and 150. Preferably, image capture device 110 may be raised or lowered without any disruption to the filming process (i.e. while rolling film) and/or interruption of the capture of pictures (not shown).

As discussed above, mechanism 140 can be adapted to be tiltable as shown by arrow 172, and can also be capable of panning as shown by arrow 174. It will be understood by a person of ordinary skill in the art that the tilting and panning function can be accomplished by any suitable methods and apparatus, including those described herein. In addition, it is contemplated that mechanism 140 can be controlled wirelessly to accomplish the panning, tilting, and elevation functions. As such mechanism 140 allows image capture device 110 to tilt up and down, pan left and right, and move up or down; in addition base 120A allow 360° rotation of structure 100. Thus, it is contemplated that the image capture device can be moved in any direction necessary to capture the desired image or angle.

It is further contemplated that a platform (not shown) can be coupled to mechanism 140 for supporting the image capture device 110. Advantageously, the platform can allow for universal mounting of different image capture devices. Still further, the platform can be releaseably coupled to mechanism 140. Additionally, the platform may have a linkage (not shown), which can be located on the top portion of the platform, which can also serve to provide a universal detachable connection between the platform and the image capture device 110. It is contemplated that the linkage can be a strap, threaded mechanism, clamp, or any other suitable device that can allow for coupling of image capture device 110 to the platform.

FIG. 1A also illustrates movement arm 112, which can be coupled to image capture device 110, mechanism 140, or the platform. Movement arm 112 allows for manual adjustment of image capture device 110 such that panning and tilting may be manipulated by a user.

Figures 2A, 2B, 2C:
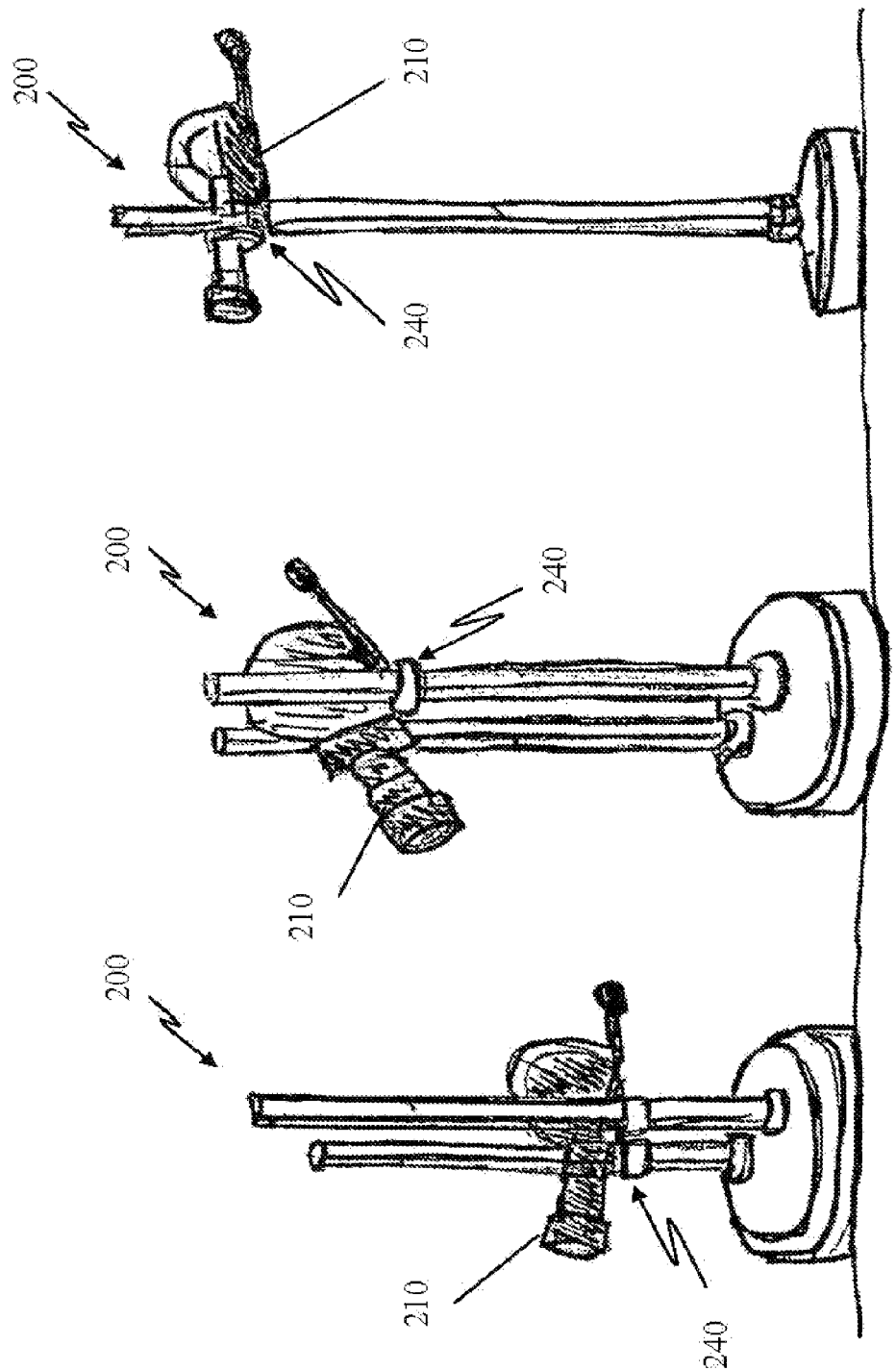
FIG. 2A is a view of an embodiment of the support structure depicting a mechanism that provides elevation of the device along the support members.
FIG. 2B is another view of the image capture device support structure of FIG. 2A.
FIG. 2C is still another view of the image capture device support structure of FIG. 2A.

As shown in FIGS. 2A-2C, mechanism 240 allows image capture device 210 to be positioned in a plurality of different position on support structure 200. For example, FIG. 2A shows image capture device 210 lowered and tilted upwards; FIG. 2B shows image capture device 210 raised and tilted downward; and FIG. 2C shows image capture device 210 raised and in a neutral position.

Figure 4A:
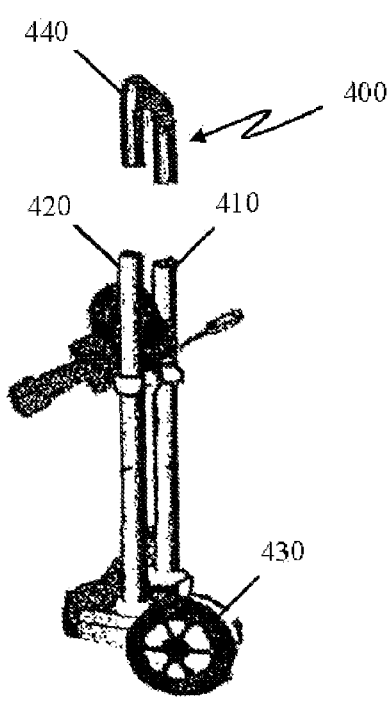
FIG. 4A is a perspective view of the support structure having wheels and a handle.
Figure 4B:
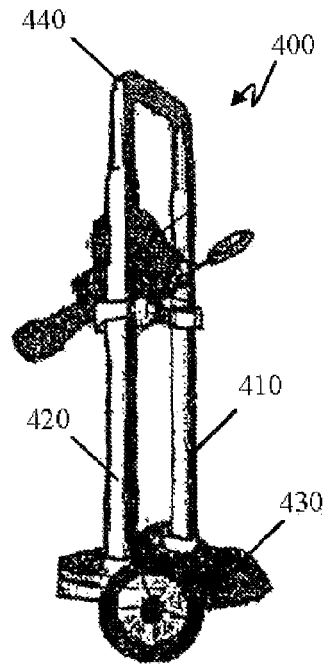
FIG. 4B is another perspective view of the support structure of FIG. 4A.
Figure 4C:
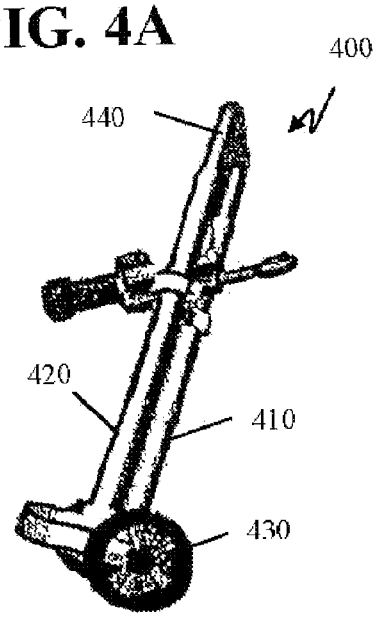
FIG. 4C is yet another perspective view of the support structure of FIG. 4A.
Figure 4D:
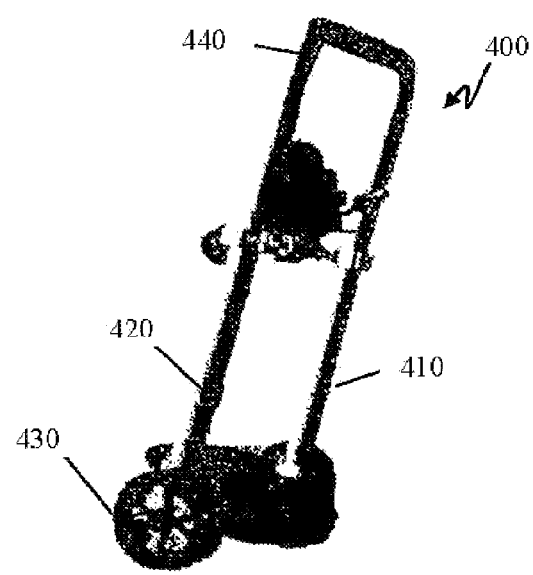
FIG. 4D is still another perspective view of the support structure of FIG. 4A.

As illustrated in FIGS. 4A-4D it is also contemplated that support structure 400 can have a transport mechanism 430 that includes wheels or any other suitable mechanisms for transporting support structure 400 from one location to another. Transport mechanism 430 can be adapted to be removable. It is further contemplated that a handle 440 can be coupled to the top portion of the support members 410 and 420. Handle 440 can facilitate movement of support structure 400. Coupling handle 440 to support members 410 and 420 can include snap fitting members, threaded members, or any other suitable couplings that are capable of securing handle 440 to support members 410 and 420. As illustrated in FIGS. 4C and 4D once handle 440 is attached, support structure 400 can be easily transported from one location to another. As is further illustrated by the FIGS. 4C and 4D the image capture device can be adjusted during transportation.

Contemplated method of positioning an image capture device includes: (1) panning the device relative a first vertically oriented, elongated support member supported by a base; (2) tilting the device relative to the first support member; (3) elevating the device relative to the first support member; and (4) positioning a second elongated support member to stabilize the device. It is contemplated that the preferred method includes adjusting a tiltable connection coupling the first and second support member to a base. In most preferred embodiments, the contemplated method includes tilting and panning the device relative to the second support member, and elevating the device along the second support member.

Thus, specific embodiments and applications of a bipod platform system have been disclosed. It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A structure for supporting an image capture device, comprising:
   a base, wherein the base is at least one of foldable and rotatable;
   a first vertically oriented, elongated support member supported by the base;
   a mechanism that provides tilting and panning of the device relative to the first support member, and elevation of the device along the first support member; and
   a second elongated support member disposed to stabilize the mechanism.

2. The structure of claim 1, further comprising at least one wheel supporting the base.

3. The structure of claim 1, wherein the base further comprises a leveling device.

4. The structure of claim 1, further comprising a rotatable connection coupling the first support member to the base.

5. The structure of claim 1, further comprising a tiltable connection coupling the first support member to the base.

6. The structure of claim 1, further comprising a releasable coupling functionally disposed between the base and the first support member.

7. The structure of claim 1, wherein the second support member is parallel to the first support member.

8. The structure of claim 1, wherein the second support member is supported by the base.

9. The structure of claim 8, further comprising a tiltable connection coupling the second support member to the base.

10. The structure of claim 8, further comprising a releasable coupling functionally disposed between the base and the second support member.

11. The structure of claim 1, further comprising the mechanism providing tilting and panning of the device relative to the second support member, and elevation of the device along the second support member.

12. The structure of claim 1, further comprising the second support member supported by a second base.

13. The structure of claim 12, wherein the second base further comprises a leveling device.

14. The structure of claim 1, wherein the first and the second support members include at least one of extending and foldable parts.

15. The structure of claim 1, further comprising a handle coupled to at least one of the first and the second support members.

* * * * *